US008968978B2

(12) United States Patent
Qiu et al.

(10) Patent No.: US 8,968,978 B2
(45) Date of Patent: Mar. 3, 2015

(54) PHASE INVERSION EMULSIFICATION RECLAMATION PROCESS

(71) Applicant: Xerox Corporation, Norwalk, CT (US)

(72) Inventors: Shigang Steven Qiu, Toronto (CA); Amy Grillo, Rochester, NY (US); Chieh-Min Cheng, Rochester, NY (US); Tie Hwee Ng, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 93 days.

(21) Appl. No.: 13/917,114

(22) Filed: Jun. 13, 2013

(65) Prior Publication Data

US 2014/0370434 A1 Dec. 18, 2014

(51) Int. Cl.
*G03G 9/087* (2006.01)
*C08L 67/02* (2006.01)
*G03G 9/08* (2006.01)

(52) U.S. Cl.
CPC ............ *G03G 9/08755* (2013.01); *C08L 67/02* (2013.01); *G03G 9/081* (2013.01)
USPC .................................................... 430/137.14

(58) Field of Classification Search
USPC .................................................... 430/137.14
See application file for complete search history.

(56) References Cited

U.S. PATENT DOCUMENTS

| 3,590,000 | A | 6/1971 | Palermiti et al. |
| 3,655,374 | A | 4/1972 | Palermiti et al. |
| 3,720,617 | A | 3/1973 | Chatterji et al. |
| 3,983,045 | A | 9/1976 | Jugle et al. |
| 5,290,654 | A | 3/1994 | Sacripante et al. |
| 5,302,486 | A | 4/1994 | Patel et al. |
| 5,853,943 | A | 12/1998 | Cheng et al. |
| 6,004,714 | A | 12/1999 | Ciccarelli et al. |
| 6,190,815 | B1 | 2/2001 | Ciccarelli et al. |
| 6,593,049 | B1 | 7/2003 | Veregin et al. |
| 6,756,176 | B2 | 6/2004 | Stegamat et al. |
| 6,830,860 | B2 | 12/2004 | Sacripante et al. |
| 7,329,476 | B2 | 2/2008 | Sacripante et al. |
| 7,494,757 | B2 | 2/2009 | Sacripante et al. |
| 7,547,499 | B2 | 6/2009 | Veregin et al. |
| 7,695,884 | B2 | 4/2010 | Vanbesien et al. |
| 7,749,673 | B2 | 7/2010 | Zhou et al. |
| 7,968,266 | B2 | 6/2011 | Field et al. |
| 8,192,913 | B2 | 6/2012 | Faucher et al. |
| 2011/0281215 | A1* | 11/2011 | Faucher et al. ............ 430/137.1 |
| 2011/0281216 | A1* | 11/2011 | Qiu et al. ................. 430/137.14 |

* cited by examiner

*Primary Examiner* — Hoa V Le
(74) *Attorney, Agent, or Firm* — Pillsbury Winthrop Shaw Pittman LLP

(57) ABSTRACT

A method for reclaiming an out-of-spec emulsion material includes recovering the out-of-spec emulsion material from a scrap manufacturing batch; distilling the out-of-spec emulsion material to raise a solids content of the out-of-spec emulsion material to about 45 wt % or more based on a total weight of the emulsion material; dissolving the distilled emulsion material in a solvent to form a first mixture; adding a base to the first mixture to neutralize acid groups present in the distilled emulsion material, forming a second mixture; emulsifying the second mixture by adding water to the second mixture; and forming particles having an average particle diameter (D50v) within a target range, wherein the out-of-spec emulsion material has an average particle diameter falling outside of the target range.

20 Claims, 2 Drawing Sheets

US 8,968,978 B2

PHASE INVERSION EMULSIFICATION RECLAMATION PROCESS

TECHNICAL FIELD

The present disclosure is generally related to toner compositions, and more specifically, to methods for reclaiming out-of-spec manufacturing batch materials used in producing toner compositions.

BACKGROUND

Toner compositions may be prepared by numerous processes, including emulsion aggregation (EA). Emulsion aggregation techniques may involve a batch or semi-continuous emulsion polymerization, as disclosed in, for example, U.S. Pat. No. 5,853,943, the entire disclosure of which is totally incorporated herein by reference.

Polyester toners may be prepared using amorphous and crystalline polyester resins as described, for example, in U.S. Pat. No. 7,547,499, the entire disclosure of which is totally incorporated herein by reference. The incorporation of these polyesters into the toner requires that they first be formulated into emulsions prepared by solvent containing batch processes, such as solvent flash emulsification and/or solvent-based phase inversion emulsification (PIE). The emulsion from the PIE process and other ingredients may be incorporated into the toner particles via an aggregation step, followed by a coalescence step at an elevated temperature.

The mean particle size (D50v) is an important characteristic of the emulsion produced from the PIE process, because the emulsion particle size affects toner slurry viscosity and the toner aggregation rate. Batches having slightly lower or slightly higher than desired particle sizes can be blended with other batches for use in the toner process. However, scrap manufacturing batches having "out-of spec" particle sizes must be disposed of properly, which is costly and bad for the environment.

SUMMARY

Provided is a method for reclaiming an out-of-spec emulsion material comprising recovering the out-of-spec emulsion material from a scrap manufacturing batch; distilling the out-of-spec emulsion material to raise a solids content of the out-of-spec emulsion material to about 45 wt % or more based on a total weight of the emulsion material; dissolving the distilled emulsion material in a solvent to form a first mixture; adding a base to the first mixture to neutralize acid groups present in the distilled emulsion material, forming a second mixture; emulsifying the second mixture by adding water to the second mixture; and forming particles having an average particle diameter (D50v) within a target range, wherein the out-of-spec emulsion material has an average particle diameter falling outside of the target range.

Also provided is a method of making a toner composition comprising reclaiming an out-of-spec emulsion material comprising recovering the out-of-spec emulsion material from a scrap manufacturing batch; distilling the out-of-spec emulsion material to raise a solids content of the out-of-spec emulsion material to greater than about 45 wt % based on a total weight of the emulsion material; dissolving the distilled emulsion material in a solvent to form a first mixture; adding a base to the first mixture to neutralize acidic groups present in the distilled emulsion material, forming a second mixture; emulsifying the second mixture by adding water to the second mixture; and forming particles having an average particle diameter (D50v) within a target range; and mixing the particles with an optional colorant, an optional wax, and other optional additives forming a mixture; and preparing a toner composition from the mixture, wherein the out-of-spec emulsion material has an average particle diameter outside of the target range.

Additionally provided is a toner prepared from a method comprising reclaiming an out-of-spec emulsion material comprising recovering the out-of-spec emulsion material from a scrap manufacturing batch; distilling the out-of-spec emulsion material to raise a solids content of the out-of-spec emulsion material to greater than about 45 wt % based on a total weight of the emulsion material; dissolving the distilled emulsion material in a solvent to form a first mixture; adding a base to the first mixture to neutralize acidic groups present in the distilled emulsion material, forming a second mixture; emulsifying the second mixture; and forming particles having an average particle diameter (D50v) within a target range; and mixing the particles with an optional colorant, an optional wax, and other optional additives forming a mixture; and preparing a toner composition from the mixture, wherein the out-of-spec emulsion material has an average particle diameter outside of the target range.

EMBODIMENTS

Figure 1:
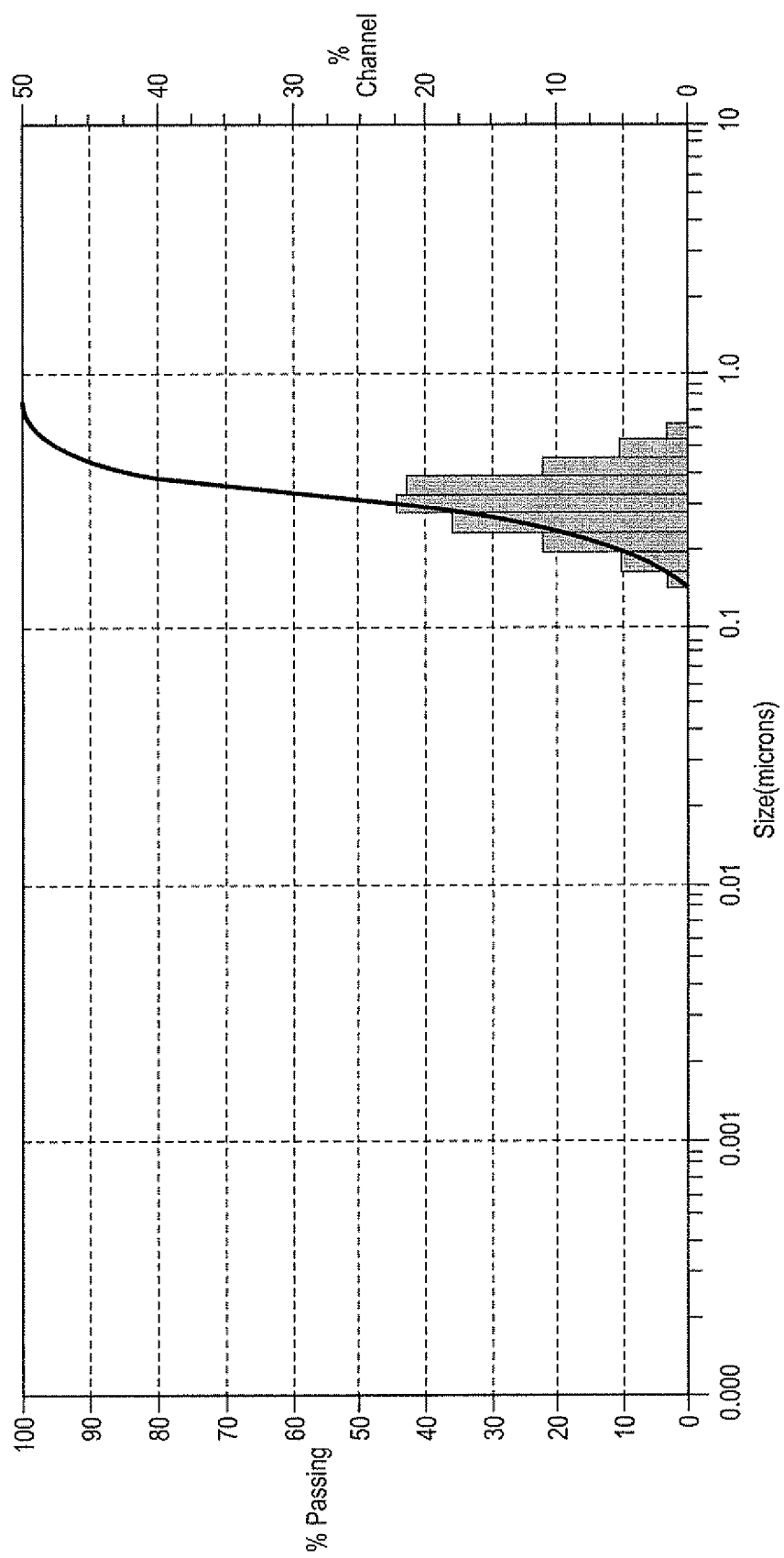
FIG. 1 is a graph showing the particle distribution for Example 1.

In this specification and the claims that follow, singular forms such as "a," "an," and "the" include plural forms unless the content clearly dictates otherwise. All ranges disclosed herein include, unless specifically indicated, all endpoints and intermediate values. In addition, reference may be made to a number of terms that shall be defined as follows:

"Optional" or "optionally" refer, for example, to instances in which subsequently described circumstances may or may not occur, and include instances in which the circumstance occurs and instances in which the circumstance does not occur.

The phrases "one or more" and "at least one" refer, for example, to instances in which one of the subsequently described circumstances occurs, and to instances in which more than one of the subsequently described circumstances occurs.

The modifier "about" used in connection with a quantity is inclusive of the stated value and has the meaning dictated by the context (for example, it includes at least the degree of error associated with the measurement of the particular quantity). When used in the context of a range, the modifier "about" should also be considered as disclosing the range defined by the absolute values of the two endpoints. For example, the range "from about 2 to about 4" also discloses the range "from 2 to 4."

"Room temperature" refers to a temperature of from about 20° C. to about 30° C., such as from about 20° C. to about 24° C., or from about 23° C. to about 27° C., or from about 26° C. to about 30° C.

The phrase "in-spec emulsion material" refers to an emulsion material having an average particle diameter (D50v) that is within a target range. For example, the target average particle diameter (D50v) of an amorphous polyester emulsion material may be from about 175 to about 225 nm, such as from about 175 to about 190 nm, or from about 185 to 210 nm, or from about 200 to about 225 nm. The target average particle diameter (D50v) of a crystalline polyester emulsion material may be from about 135 to about 200 nm, such as from about 135 to about 160 nm, or from about 145 to about 175 nm, or from about 170 to about 200 nm.

The phrase "out-of-spec emulsion material" refers to an emulsion material having an average particle diameter that is not inside the target range. For example, an out-of-spec emulsion material includes an emulsion batch that has an average particle size greater than about 225 nm, or greater than about 300 nm, or from about 300 nm to about 1 µm.

The phrase "scrap manufacturing batch" refers to a manufacturing batch produced during the formation of an emulsion, wherein the resulting emulsion is an out-of-spec emulsion material. For example, the scrap manufacturing batch may be an emulsion manufacturing batch that includes out-of-spec emulsion material due to operational error.

A process of reclaiming out-of-spec emulsion material includes recovering out-of-spec emulsion material from a scrap manufacturing batch, distilling the out-of-spec emulsion material to obtain a reclaimed emulsion material, and performing a phase inversion emulsification (PIE) process using the emulsion reclaimed material.

The out-of-spec emulsion material may be distilled to raise the solid content of the out-of-spec emulsion material to a solid content of greater than about 45 wt %, or greater than about 55 wt %, or greater than about 65 wt %, or from about 45 wt % to about 85 wt %, or from about 50 wt % to about 75 wt %, or from about 55 wt % to about 70 wt %, based on the total weight of the emulsion material. The out-of-spec emulsion material may be distilled by, for example, heating the out-of-spec emulsion material to a temperature of from about 50° C. to about 100° C., such as from about 50° C. to about 90° C., or from about 52° C. to about 80° C., or from about 55° C. to about 75° C.

The PIE process comprises contacting the distilled emulsion material with a solvent forming a mixture; optionally heating the mixture and stirring the mixture to promote dissolution of the distilled emulsion material in the solvent; contacting the mixture with a neutralizing agent to form a neutralized mixture; contacting the neutralized mixture with de-ionized water by, for example, adding the de-ionized water until phase inversion occurs, to form an emulsion; recovering the solvent from the emulsion by, for example, vacuum distillation; and recovering latex particles. The recovered latex particles may then be used to form toner particles. A first portion of the distillate collected in the distillation process may comprise rich solvents and less water. This portion of the distillate may be re-used in a subsequent emulsification process.

In the phase inversion emulsification process, the distilled emulsion material may be dissolved in a single organic solvent that is miscible or partially miscibile in water or in a mixture of organic solvents at a concentration of from about 1 to about 95 wt % resin in solvent, such as from about 1 to about 40 wt %, or from about 30 to about 60 wt %, or from about 50 to about 95 wt %. For example, a distilled emulsion material comprising a polyester resin and/or a combination of at least one amorphous and crystalline polyester resins may be dissolved in methyl ethyl ketone (MEK) or in a mixture of methyl ethyl ketone (MEK) and isopropyl alcohol (IPA). Additional suitable solvents include alcohols, esters, ethers, ketones, amines, and combinations thereof. When used, a weight ratio of the distilled emulsion material to the MEK to the IPA may be from about 10:3:0.5 to about 10:20:5, such as from about 10:5:0.8 to about 10:15:3, or from about 10:6:1 to about 10:10:2, or from about 10:6.5:1.4 to about 10:7.5:1.5.

To promote dissolution of the distilled emulsion material in the solvent, the emulsion mixture may then be heated to a temperature of from about 25° C. to about 100° C., such as from about 25° C. to about 40° C., or from about 30° C. to about 70° C., or from about 65° C. to about 100° C. While higher water temperatures may accelerate the dissolution process, latexes can be formed at temperatures as low as room temperature. For example, the water temperature may be from about 20° C. to about 110° C., such as from about 20° C. to about 50° C., or from about 40° C. to about 80° C., or from about 70° C. to about 110° C. The heating may be held at a constant temperature, or may be varied. For example, the heating may be slowly or incrementally increased until a desired temperature is achieved.

The solution containing the distilled emulsion material dissolved in the solvent may then be mixed with a weak base or neutralizing agent to, for example, neutralize acid groups in the resin. Suitable neutralizing agents include both inorganic basic agents and organic basic agents. Suitable basic agents include ammonium hydroxide, potassium hydroxide, sodium hydroxide, sodium carbonate, sodium bicarbonate, lithium hydroxide, potassium carbonate, combinations thereof, and the like. Suitable basic agents also include monocyclic compounds and polycyclic compounds having at least one nitrogen atom, such as, for example, secondary amines, which include aziridines, azetidines, piperazines, piperidines, pyridines, bipyridines, terpyridines, dihydropyridines, morpholines, N-alkylmorpholines, 1,4-diazabicyclo[2.2.2]octanes, 1,8-diazabicycloundecanes, 1,8-diazabicycloundecenes, dimethylated pentylamines, trimethylated pentylamines, pyrimidines, pyrroles, pyrrolidines, pyrrolidinones, indoles, indolines, indanones, benzindazones, imidazoles, benzimidazoles, imidazolones, imidazolines, oxazoles, isoxazoles, oxazolines, oxadiazoles, thiadiazoles, carbazoles, quinolines, isoquinolines, naphthyridines, triazines, triazoles, tetrazoles, pyrazoles, pyrazolines, and combinations thereof.

The neutralizing agent may be used in an amount of from about 0.001 to 50 wt % of the emulsion, such as from about 0.01 to about 25 wt %, or from about 0.1 to about 5 wt %. The neutralizing agent may be added in the form of an aqueous solution, or the neutralizing agent may be added in the form of a solid.

By using the neutralization agent in combination with an emulsion possessing acid groups, a neutralization ratio of from about 50 to about 300% may be achieved, such as from about 50 to about 140%, or from about 70 to about 200%, or from about 180 to 300%. The neutralization ratio may be calculated as the molar ratio of basic groups provided with the basic neutralizing agent to the acid groups present in the resin multiplied by 100%.

The addition of the neutralizing agent may raise the pH of an emulsion possessing acid groups from about 5 to about 12, such as from about 6 to about 11. The neutralization of the acid groups may enhance formation of the emulsion.

A surfactant also may optionally be added to the emulsion, optionally at an elevated temperature. The surfactant may be added before, during, or after the addition of the neutralizing agent. The emulsion may include one, two, or more surfactants. The surfactants may be selected from ionic surfactants and nonionic surfactants. Anionic surfactants and cationic surfactants are encompassed by the term "ionic surfactants." The surfactant may be added as a solid, or as a solution with a concentration of from about 5 to about 100 wt %, such as from about 10 to about 95 wt %, based on a total weight of the solution. The surfactant may be present in an amount of from about 0.01 to about 20 wt % based on a total weight of the resin, such as from about 0.1% to about 16 wt % of the resin, or from about 1% to about 14 wt % of the resin.

Suitable anionic, cationic, and nonionic surfactants include those disclosed in U.S. Pat. No. 8,192,913, the entire disclosure of which is totally incorporated herein by references. Combinations of these surfactants and any of the foregoing surfactants may be used.

For emulsification, water may be added to form a latex with a solids content of from about 5 to about 50 wt % based on the total weight of the emulsion, such as from about 5 to about 25 wt %, or from about 20 to about 40 wt %, or from about 35 to about 50 wt %, at temperatures that melt or soften the emulsion, such as from about 40° C. to about 120° C., or from about 60° C. to about 100° C.

The desired properties of the emulsion may be achieved by adjusting the solvent and neutralizer concentration and process parameters, such as reactor temperature, vacuum, and process time.

Although the point of phase inversion may vary depending on the components of the emulsion, the heating temperature, the stirring speed, and the like, phase inversion may occur when the basic neutralization agent, optional surfactant, or water has been added so that the resulting resin is present in an amount from about 5 wt % to about 70 wt % based on the total weight of the emulsion, such as from about 5 to about 30 wt %, or from about 20 to about 65 wt %, or from about 50 to about 70 wt %.

Following phase inversion, additional surfactant, water, and/or aqueous alkaline solution may optionally be added to dilute the solid content to an amount of less than 50 wt % of the phase inversed emulsion. Following phase inversion, the phase inversed emulsion may be cooled to room temperature.

The resulting phase inversed emulsions may then be used to produce particles that are suitable for forming a toner by any method within the purview of those skilled in the art. For example, the emulsion may be contacted with an optional colorant, optionally in a dispersion, an optional wax, and other optional additives to form a toner by a suitable process. Suitable methods include an emulsion aggregation processes or any other suitable method of preparing toner particles, including chemical processes, such as suspension and encapsulation processes disclosed in U.S. Pat. Nos. 5,290,654 and 5,302,486, the disclosures of which are totally incorporated herein by reference.

Resin Materials

Any resin for forming a latex emulsion may be to make the emulsion material. The emulsion material may comprise an amorphous resin, a crystalline resin, and/or a mixture thereof. Suitable resins include polyester resins, including the resins described in U.S. Pat. Nos. 6,593,049 and 6,756,176, the entire disclosures of which are totally incorporated herein by reference. Suitable resins may also include a mixture of at least one amorphous polyester resin and a crystalline polyester resin, as described in U.S. Pat. No. 6,830,860, the entire disclosure of which is totally incorporated herein by reference.

The resin may be a polyester resin having an acid number from about 2 to about 200 mg KOH/g of resin, such as from about 2 to about 30 mg KOH/g of resin, or from about 5 to about 50 mg KOH/g of resin, or from about 8 to about 200 mg KOH/g of resin. The acid-containing resin may be dissolved in tetrahydrofuran solution. The acid number may be detected by titration with KOH/methanol solution containing phenolphthalein as the indicator. The acid number may then be calculated based on the equivalent amount of KOH/methanol required to neutralize all the acid groups on the resin identified as the end point of the titration The emulsion material may include at least one low molecular weight amorphous polyester resin, at least one high molecular weight amorphous resin, and at least one crystalline polyester resin. A high molecular weight amorphous polyester resin is an amorphous polyester resin having a weight average molecular weight (Mw) greater than or equal to 50,000, for example, from 50,000 to about 150,000, from about 50,000 to about 100,000, from about 63,000 to about 94,000, or from about 68,000 to about 85,000, as determined by GPC using polystyrene standard, while a low molecular weight amorphous polyester resin has a weight average molecular weight (Mw) that is less than 50,000, for example, from about 2,000 to about 45,000, from about 3,000 to about 40,000, from about 10,000 to about 30,000 and from about 18,000 to about 21,000.

Suitable high molecular weight amorphous polyester resins have a number average molecular weight (Mn), as measured by gel permeation chromatography (GPC), of from about 2,000 to about 15,000, such as from about 2,000 to about 5,000, or from about 3,000 to about 8,000, or from about 5,000 to about 15,000. Suitable low molecular weight amorphous polyester resins have a number average molecular weight (Mn), as measured by gel permeation chromatography (GPC) of, for example, from about 1,000 to about 10,000, such as from about 1,000 to about 4,000, from about 3,000 to about 6,000, and from about 5,000 to about 10,000.

The polydispersity index (PDI), which is the ratio of Mw to Mn, of the high molecular weight amorphous polyester resin may be, for example, greater than about 4, such as from about 4 to about 20, or from about 4 to about 9, or from about 8 to about 14, or from about 12 to about 20, while the PDI of the low molecular weight amorphous polyester resin may be, for example, from about 2 to about 10, such as from about 2 to about 5, or from about 2 to about 8.

The at least one low molecular weight amorphous polyester resin may be present in the emulsion composition in an amount of from about 25 to about 85 wt % based on a total weight of the emulsion composition, such as from about 25 to about 45 wt %, or from about 30 to about 50 wt %, or from about 40 to about 70 wt %. The at least one high molecular weight amorphous polyester resin may be present in the emulsion composition in an amount of from about 25 to about 75 wt % based on a total weight of the emulsion composition, such as from about 25 to about 45 wt %, or from about 30 to about 50 wt %, or from about 40 to about 70 wt %. The at least one crystalline polyester resin may be present in the emulsion composition in an amount of from about 1 to about 15 wt %, such as from about 1 to about 6 wt %, or from about 5 to about 11 wt %, or from about 6 to about 15 wt %, based on a total weight of the emulsion composition.

The ratio of crystalline resin to the low molecular weight amorphous resin to high molecular weight amorphous polyester resin may be from about 1:1:98 to about 98:1:1 to about 1:98:1, or from about 1:5:5 to about 1:9:9, such as from about 1:6:6 to about 1:8:8. However, amounts and ratios outside of these ranges can be used depending upon the type and amounts of other materials present.

The resin may possess acid groups present at the terminal ends of the resin. Acid groups which may be present include carboxylic acid groups, and the like. The number of carboxylic acid groups may be controlled by adjusting the materials used to form the resin and the reaction conditions.

Amorphous Polyester Resins

The monomers used in making the amorphous polyester resin are not limited, and may include any one or more of, for example, diacids or diesters including dicarboxylic acids or diesters such as terephthalic acid, phthalic acid, isophthalic acid, fumaric acid, trimellitic acid, dimethyl fumarate, dimethyl itaconate, cis, 1,4-diacetoxy-2-butene, diethyl fumarate, diethyl maleate, maleic acid, succinic acid, itaconic acid, succinic acid, succinic anhydride, dodecylsuccinic acid, dodecylsuccinic anhydride, glutaric acid, glutaric anhydride, adipic acid, pimelic acid, suberic acid, azelaic acid, dodecanediacid, dimethyl terephthalate, diethyl terephthalate, dimethylisophthalate, diethylisophthalate, dimethylphthalate, phthalic anhydride, diethylphthalate, dimethylsuccinate, dimethylfumarate, dimethylmaleate, dimethylglutarate, dimethyladipate, dimethyl dodecylsuccinate, and combinations thereof. The organic diacids or diesters may be present, for example, in an amount of from about 40 to about 60 mol % of the resin, such as from about 42 to about 52 mol %, or from about 45 to about 50 mol %.

Suitable diols for generating the amorphous polyester include 1,2-propanediol, 1,3-propanediol, 1,2-butanediol, 1,3-butanediol, 1,4-butanediol, pentanediol, hexanediol, 2,2-dimethylpropanediol, 2,2,3-trimethylhexanediol, heptanediol, dodecanediol, bis(hydroxyethyl)-bisphenol A, bis (2-hydroxypropyl)-bisphenol A, 1,4-cyclohexanedimethanol, 1,3-cyclohexanedimethanol, xylenedimethanol, cyclohexanediol, diethylene glycol, bis (2-hydroxyethyl) oxide, dipropylene glycol, dibutylene, and combinations thereof. The amount of organic dials selected can vary, and may be present, for example, in an amount from about 40 to about 60 mol % of the resin, such as from about 42 to about 55 mol % of the resin, or from about 45 to about 53 mol % of the resin Any suitable method for forming the amorphous polyester from the monomers may be used without restriction.

As mentioned above, the emulsion may comprise a mixture of a low molecular weight amorphous polyester and a high molecular weight amorphous resin. Suitable low molecular weight amorphous polyester resins and high molecular weight amorphous resins include those known in the art, such as those disclosed in U.S. Pat. No. 8,192,913, the entire disclosure of which is totally incorporated herein by reference.

Crystalline Polyester Resin

As used herein, "crystalline" refers to a resin with a three dimensional order. "Semicrystalline resins" as used herein refers to resins with a crystalline percentage of, for example, from about 10 to about 90%, or from about 10 to about 35%, or from about 12 to about 70%, or from about 60 to about 90%. Further, as used hereinafter "crystalline polyester resins" and "crystalline resins" encompass both crystalline resins and semicrystalline resins, unless otherwise specified.

Suitable crystalline resins may have a melting point of, for example, from about 30° C. to about 120° C., or from about 50° C. to about 90° C. Suitable crystalline resins may have a number average molecular weight (Mn), as measured by gel permeation chromatography (GPC) of, for example, from about 1,000 to about 20,000, such as from about 2,000 to about 10,000, and a weight average molecular weight (Mw) of, for example, from about 2,000 to about 100,000, such as from about 3,000 to about 80,000, as determined by gel permeation chromatography using polystyrene standards. The PDI of a suitable crystalline resin may be, for example, from about 2 to about 10, or from about 2 to about 6, or from about 3 to about 5.

Suitable crystalline polyester resins include known in the art, such as those disclosed in, for example, U.S. Pat. No. 8,192,913, the entire disclosure of which is totally incorporated herein by reference. Suitable crystalline polyester resins also include those disclosed in U.S. Pat. Nos. 7,329,476; 7,494,757; 7,968,266; 7,749,673; and 7,695,884, the entire disclosures of which are totally incorporate herein by reference.

Colorants

Suitable colorants or pigments include pigment, dye, mixtures of pigment and dye, mixtures of pigments, mixtures of dyes, and the like. For simplicity, the term "colorant" refers to colorants, dyes, pigments, and mixtures, unless specified as a particular pigment or other colorant component. The colorant may comprise a pigment, a dye, mixtures thereof, carbon black, magnetite, black, cyan, magenta, yellow, red, green, blue, brown, and mixtures thereof, in an amount of about 0.1 to about 35 wt % based upon the total weight of the composition, such as from about 1 to about 25 wt %.

Suitable colorants include those known in the art, such as those disclosed in, for example, U.S. Pat. No. 8,192,913, the entire disclosure of which is totally incorporated herein by reference. The colorant may be present in the toner in an amount ranging from about 1 to about 35 wt % of the toner particles on a solids basis, such as from about 5 to about 25 wt %, or from about 5 to about 15 wt %.

Wax

Suitable waxes include either a single type of wax or a mixture of two or more different waxes. A single wax can be added to toner formulations, for example, to improve particular toner properties, such as toner particle shape, presence and amount of wax on the toner particle surface, charging and/or fusing characteristics, gloss, stripping, offset properties, and the like. Alternatively, a combination of waxes may be added to provide multiple properties to the toner composition.

Suitable waxes include those known in the art, such as, for example, those disclosed in U.S. Pat. No. 8,192,913, the entire disclosure of which is totally incorporated herein by reference. The toner particles may contain the wax in an amount of, for example, from about 1 to about 25 wt % of the toner particles, such as from about 3 to about 15 wt %, or from about 5 to about 20 wt %, or from about 5 to about 12 wt %.

Additives

Suitable toner particle additives include any additive that enhances the properties of the toner composition. For example, the toner may include positive or negative charge control agents. Other additives include organic spacers, color enhancers, and other known toner additives. Surface additives that can be added to the toner compositions after washing or drying include, for example, metal salts, metal salts of fatty acids, colloidal silicas, metal oxides, strontium titanates, combinations thereof, and the like, which additives may each be present in an amount of from about 0.1 to about 10 wt % of the toner particles, such as from about 0.5 to about 7 wt %. Examples of such additives include, for example, those disclosed in U.S. Pat. Nos. 3,590,000; 3,720,617; 3,655,374; and 3,983,045, the entire disclosures of which are totally incorporated herein by reference. Other additives include zinc stearate and AEROSIL R972® available from Degussa. The coated silicas of U.S. Pat. Nos. 6,190,815 and 6,004,714, the entire disclosures of which are totally incorporated herein by reference, may also be selected in amounts, for example, of from about 0.05 to about 5 wt % of the toner particles, such as from about 0.1 to about 2 wt %. These additives may be added during the aggregation or blended into the formed toner product.

EXAMPLES

The following Examples are intended to be illustrative only and are not intended to limit the scope of the present disclosure. Also, parts and percentages are by weight unless otherwise indicated.

Example 1

2 L Reclaimed Phase Inversion Emulsification (PIE)

725 g of out-of-spec emulsion material having a measured solid content of 33.78 wt % was poured in an open glass pan and heated to 57° C. on a hot plate, while stirring with a stirrer, to remove part of the water from the out-of-spec emulsion material to obtain a reclaimed emulsion material. After 5.5 hours of evaporation, 357.6 g of the reclaimed emulsion material having a solid content of 66.6 wt % was transferred to a 2 L stainless steel Buchi reactor equipped with an anchor blade impeller. 155 g of MEK, 33.3 g of IPA, and 2.4 g of 10% ammonium hydroxide solution were also added to the reactor. The ratio of emulsion material to MEK to IPA was 10:6.5:1.4.

The anchor impeller was set to 350 rpm, the reactor was sealed, and the heating bath was started at a set point temperature of 45° C. After 30 minutes, the reactor temperature reached 42.0° C., and 4.5 g of 10% ammonium hydroxide solution was added to the reactor over 2 minutes. After 10 minutes holding time, 345 g of deionized water was pumped into the reactor at a flow rate of 34.5 g/min for 10 min.

As shown in FIG. 1, the reclaimed phase inversed emulsion had a particle size of 272 nm (prepared with 50° C. deionized water) as measured using a Nanotrac particle size analyzer.

The latex containing the solvents having a solid content of 26.3 wt % was poured into a glass pan, which was kept in a fume hood and stirred by a stirrer to evaporate the solvent. The final emulsion after the solvent removal was stable. A small amount of the emulsion was air dried and submitted for DSC and GPC analysis. The analytic data is listed in Table 1.

Example 2

2 L Reclaimed PIE 1000 g of the same out-of-spec emulsion material used in Example 1 and having a solid content of 33.78 wt % was poured in an open glass pan and heated to 57° C. on a hot plate, while stirring with a stirrer, to remove part of the water from the out-of-spec emulsion material to obtain a reclaimed emulsion material. After 6.0 hours of evaporation, 507.8 g of the reclaimed emulsion material having a solid content of 65.0 wt % was transferred to a 2 L stainless steel Buchi reactor equipped with an anchor blade impeller. 248 g of MEK, 46.2 g of IPA, and 3.3 g of 10% ammonium hydroxide solution was also added to the reactor. The ratio of the resin to MEK to IPA was 10:7.5:1.4.

The anchor impeller was set to 400 rpm, the reactor was sealed, and the heating bath was started at a set point temperature of 45° C. After 31 minutes, the reactor temperature reached 42.4° C., and 6.3 g of 10% ammonium hydroxide solution was added to the reactor over 2 minutes. After 10 minutes holding time, 470 g deionized water was pumped into the reactor at a flow rate of 39.2 g/min over 12 min.

Figure 2:
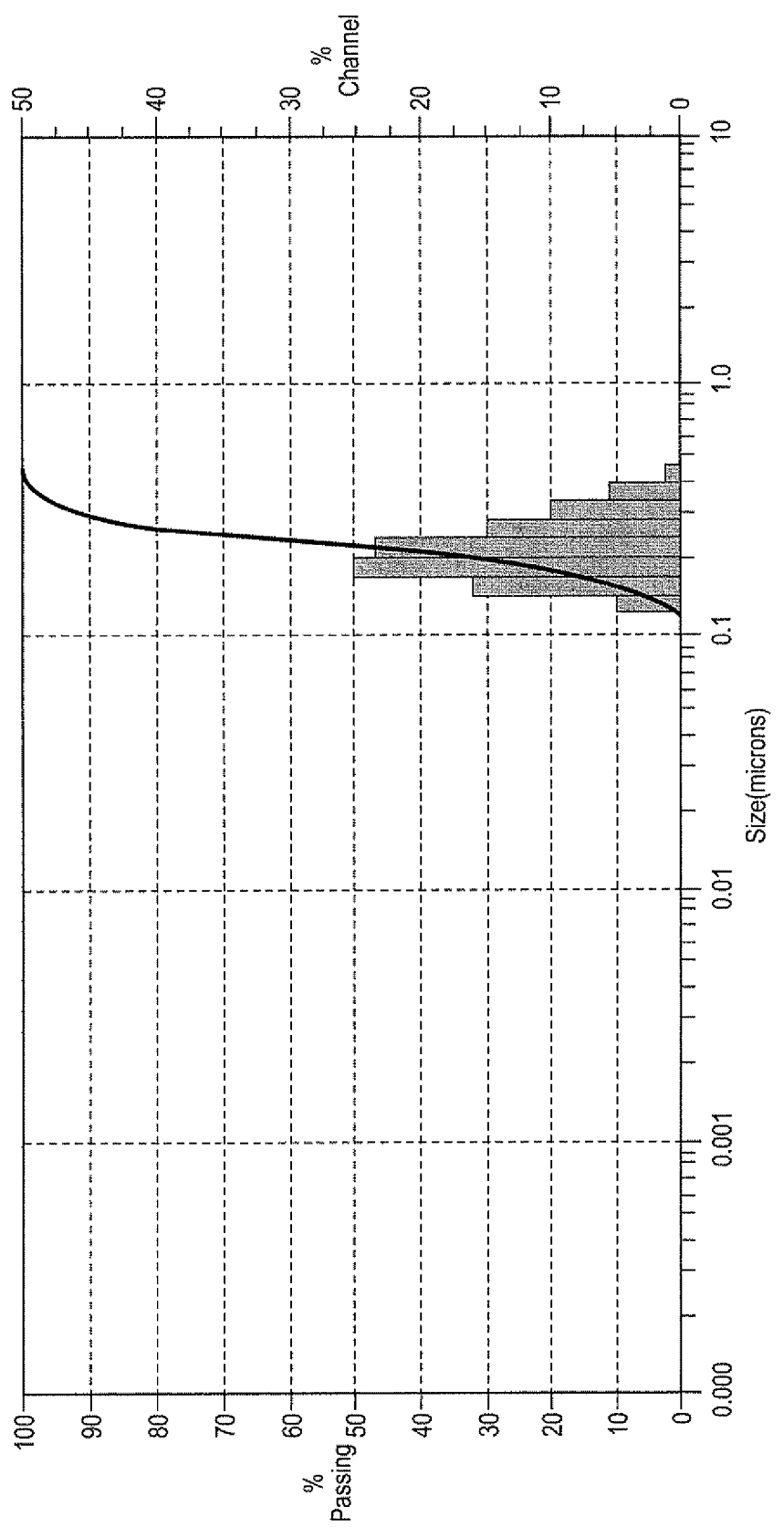
FIG. 2 is a graph showing the particle distribution for Example 2.

As shown in FIG. 2, the reclaimed phase inversed emulsion had a particle size of 211 nm (prepared with 50° C. deionized water) as measured using a Nanotrac particle size analyzer.

The latex containing the solvents was poured into a glass pan, which was kept in a fume hood and stirred by a stirrer to evaporate the solvent. The final emulsion after the solvent removal was stable. A small amount of the emulsion was air dried and submitted for DSC and GPC analysis. The analytical data is listed in Table 1.

TABLE 1

| Result | Example 1 Latex ($2^{nd}$ cycle) | Example 2 Latex ($2^{nd}$ cycle) | Scrap Material Scrap ($1^{st}$ Cycle) |
|---|---|---|---|
| Particle Size D50v (nm) | 272 | 211 | Average |
| Tg (onset, ° C.) | 56.36 | 55.33 | 56.03 |
| GPC - Mw (kDalton) | 96.44 | 95.48 | 100.47 |
| GPC - Mn (kDalton) | 8.01 | 8.08 | 6.78 |
| GPC - polydispersity | 12.05 | 11.82 | 14.82 |
| % Mw degraded | 4.0 | 5.0 | 0 |
| Acid value (mgKOH/g) | 12.35 | 11.69 | 11.83 |

As shown in Table 1, the reclaimed PIE process had a minor impact on the molecular weight (Mw), which was degraded by 4.0% in Example 1 and by 5.0% in Example 2. At this level, it had little effect on the fusing performance of the toner. Alternatively, the reclaimed manufacturing batch could be blended with other batches to be used in an Eco toner production. There was no significant influence on the glass transition temperature (Tg) and the acid value of the final emulsions. Thus, the PIE reclamation process was able to recover the scrap materials for reuse in a toner production process.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A method for reclaiming an out-of-spec emulsion material comprising:
   recovering the out-of-spec emulsion material from a scrap manufacturing batch;
   distilling the out-of-spec emulsion material to raise a solids content of the out-of-spec emulsion material to about 45 wt % or more based on a total weight of the emulsion material;
   dissolving the distilled emulsion material in a solvent to form a first mixture;
   adding a base to the first mixture to neutralize acid groups present in the distilled emulsion material, forming a second mixture;
   emulsifying the second mixture by adding water to the second mixture; and
   forming particles having an average particle diameter (D50v) within a target range,
   wherein the out-of-spec emulsion material has an average particle diameter falling outside of the target range.

2. The method of claim 1, wherein the solids content of the out-of-spec emulsion material is increased to a range of from about 45 wt % to about 85 wt %.

3. The method of claim 1, wherein the out-of-spec emulsion material is distilled for from about 3 to about 6 hours.

4. The method of claim 1, wherein the out-of-spec emulsion material is distilled by heating the out-of-spec emulsion material to a temperature of from about 50° C. to about 65° C.

5. The method of claim 1, wherein the out-of-spec emulsion material comprises a mixture of polyester resins.

6. The method of claim 5, wherein the mixture of polyester resins comprises a low molecular weight amorphous polyester resin, a high molecular weight amorphous polyester resin, and a crystalline polyester resin,
wherein:
the low molecular weight amorphous polyester resin has a weight average molecular weight (Mw) of less than 50,000; and
the high molecular weight amorphous polyester resin has a weight average molecular weight (Mw) of equal to or greater than 50,000.

7. The method of claim 1, wherein the D50v target range is from about 150 to about 300 nm.

8. The method of claim 1, further comprising:
removing the solvent from the second mixture; and
collecting the solvent.

9. The method of claim 1, wherein the water is preheated to a temperature of from about 30° C. to about 100° C. prior to being added to the second mixture.

10. The method of claim 1, wherein the solvent is a mixture of methyl ethyl ketone (MEK) and isopropyl alcohol (IPA).

11. The method of claim 10, wherein a weight ratio of the distilled emulsion material to the MEK to the IPA is from about 10:6.5:1.4 to about 10:7.5:1.4.

12. A method of making a toner composition comprising:
reclaiming an out-of-spec emulsion material comprising:
recovering the out-of-spec emulsion material from a scrap manufacturing batch;
distilling the out-of-spec emulsion material to raise a solids content of the out-of-spec emulsion material to greater than about 45 wt % based on a total weight of the emulsion material;
dissolving the distilled emulsion material in a solvent to form a first mixture;
adding a base to the first mixture to neutralize acidic groups present in the distilled emulsion material, forming a second mixture;
emulsifying the second mixture by adding water to the second mixture; and
forming particles having an average particle diameter (D50v) within a target range; and
mixing the particles with an optional colorant, an optional wax, and other optional additives forming a mixture; and
preparing a toner composition from the mixture,
wherein the out-of-spec emulsion material has an average particle diameter outside of the target range.

13. The method of claim 12, wherein the out-of-spec emulsion material comprises a mixture of polyester resins.

14. The method of claim 13, wherein the mixture of polyester resins comprises a low molecular weight amorphous polyester resin, a high molecular weight amorphous polyester resin, and a crystalline polyester resin,
wherein:
the low molecular weight amorphous polyester resin has a weight average molecular weight (Mw) of less than 50,000; and
the high molecular weight amorphous polyester resin has a weight average molecular weight (Mw) of equal to or greater than 50,000.

15. The method of claim 12, wherein the solids content of the out-of-spec emulsion material is increased to a range of from about 45 wt % to about 85 wt %.

16. The method of claim 12, wherein the D50v target range is from about 150 to about 300 nm.

17. The method of claim 12, wherein the solvent is a mixture of methyl ethyl ketone (MEK) and isopropyl alcohol (IPA).

18. The method of claim 17, wherein a weight ratio of the distilled emulsion material to the MEK to the IPA is from about 10:6.5:1.4 to about 10:7.5:1.4.

19. A toner prepared from a method comprising:
reclaiming an out-of-spec emulsion material comprising:
recovering the out-of-spec emulsion material from a scrap manufacturing batch;
distilling the out-of-spec emulsion material to raise a solids content of the out-of-spec emulsion material to greater than about 45 wt % based on a total weight of the emulsion material;
dissolving the distilled emulsion material in a solvent to form a first mixture;
adding a base to the first mixture to neutralize acidic groups present in the distilled emulsion material, forming a second mixture;
emulsifying the second mixture; and
forming particles having an average particle diameter (D50v) within a target range; and
mixing the particles with an optional colorant, an optional wax, and other optional additives forming a mixture; and
preparing a toner composition from the mixture,
wherein the out-of-spec emulsion material has an average particle diameter outside of the target range.

20. The toner of claim 19, wherein the D50v target range is from about 150 to about 300 nm.

* * * * *